(12) United States Patent
Olding et al.

(10) Patent No.: US 8,653,423 B2
(45) Date of Patent: Feb. 18, 2014

(54) THICK FILM HIGH TEMPERATURE THERMOPLASTIC INSULATED HEATING ELEMENT

(75) Inventors: Timothy Russell Olding, Kingston (CA); Mary Ann Ruggiero, Toronto (CA)

(73) Assignee: Datec Coating Corporation, Mississauga (CA)

( * ) Notice: Subject to any disclaimer, the term of this patent is extended or adjusted under 35 U.S.C. 154(b) by 1335 days.

(21) Appl. No.: 12/385,889

(22) Filed: Apr. 22, 2009

(65) Prior Publication Data

US 2009/0272731 A1 Nov. 5, 2009

Related U.S. Application Data

(60) Provisional application No. 61/071,336, filed on Apr. 22, 2008.

(51) Int. Cl.
*H05B 3/02* (2006.01)

(52) U.S. Cl.
USPC .......................................... 219/482; 219/543

(58) Field of Classification Search
USPC .............. 219/216, 494, 529, 543, 545, 466.1, 219/759; 252/500, 511, 514
See application file for complete search history.

(56) References Cited

U.S. PATENT DOCUMENTS

| | | | |
|---|---|---|---|
| 5,993,973 A | 11/1999 | Lee et al. | |
| 6,184,496 B1 | 2/2001 | Pearce | |
| 6,194,692 B1 | 2/2001 | Oberle | |
| 6,222,158 B1 * | 4/2001 | Nakata et al. | 219/216 |
| 6,229,098 B1 * | 5/2001 | Dunn et al. | 174/260 |
| 6,736,997 B2 | 5/2004 | Olding et al. | |
| 2002/0145134 A1 * | 10/2002 | Olding et al. | 252/500 |
| 2002/0153368 A1 * | 10/2002 | Gardner et al. | 219/545 |
| 2006/0138121 A1 | 6/2006 | Werkman et al. | |
| 2008/0290088 A1 | 11/2008 | Leboeuf et al. | |
| 2009/0272731 A1 | 11/2009 | Olding et al. | |

FOREIGN PATENT DOCUMENTS

| | | |
|---|---|---|
| AU | 55070/86 | 10/1986 |
| CN | 1202511 | 12/1998 |
| CN | 1973577 | 5/2007 |

(Continued)

OTHER PUBLICATIONS

Barrow, David. Applications of Composite Sol-Gel Coatings. Journal of the Danish Ceramic Society. No. 5(1), pp. 4-6. 2002.

(Continued)

*Primary Examiner* — Brian Jennison
(74) *Attorney, Agent, or Firm* — Lynn C. Schumacher; Hill & Schumacher

(57) ABSTRACT

The present invention provides an integrated thick film heating element on a substrate made from high temperature melt-flowable thermoplastic polymer/powder additive formulations which form an electrically insulating thermoplastic dielectric coating on the substrate, and electrically resistive lead free films and electrically conductive film formulations that are deposited and fired to form an integrated thick film heating element on a substrate at a processing temperature well below 600° C. This thick film heating element is formed on a substrate material coated first with the electrically insulating, filled melt flowable high temperature thermoplastic polymer/powder composite layer on which is deposited the electrically resistive lead free thick film that is capable of operating over a wide range of power densities for consumer and industrial heating element applications, with suitable electrical insulation properties under temperature cycling to for example 250° C.

59 Claims, 4 Drawing Sheets

(56) References Cited

FOREIGN PATENT DOCUMENTS

| | | |
|---|---|---|
| CN | 200973180 | 11/2007 |
| EP | 0209224 | 1/1987 |
| EP | 0250905 | 1/1988 |
| EP | 0 336 436 | 10/1989 |
| EP | 0 640 669 | 3/1995 |
| EP | 0 790 754 | 8/1997 |
| EP | 0 954 201 | 11/1999 |
| EP | 1905270 | 4/2008 |
| WO | WO 96/29447 | 9/1996 |
| WO | WO 97/11040 | 3/1997 |
| WO | WO 98/22548 | 5/1998 |
| WO | WO 02/072495 | 9/2002 |
| WO | WO 02/085072 | 10/2002 |

OTHER PUBLICATIONS

International Search Report for PCT/CA2010/001652 included with the publication of the PCT application as WO2011047471 on Apr. 28, 2011.

Int'l Search Report PCT/CA2009/000525.

* cited by examiner

THICK FILM HIGH TEMPERATURE THERMOPLASTIC INSULATED HEATING ELEMENT

CROSS REFERENCE TO RELATED U.S. APPLICATIONS

This patent application relates to, and claims the priority benefit from, U.S. Provisional Patent Application Ser. No. 61/071,336 filed on Apr. 22, 2008, in English, entitled THICK FILM HIGH TEMPERATURE THERMOPLASTIC INSULATED METAL BASED HEATING ELEMENT, and which is incorporated herein by reference in its entirety.

FIELD OF THE INVENTION

The present invention relates to a thick film high temperature thermoplastic insulated resistive heating element suitable for substrates having a low melting point and/or high coefficient of thermal expansion (CTE) and a method for producing same using composite coating synthesis methods.

BACKGROUND OF THE INVENTION

Thick film heating elements have been long sought after because of their ability to provide versatile designs, high power densities, uniform heat and rapid heating and cooling. These types of element designs are very efficient for direct heating either by placing the thick film element in contact with the component being heated or when they are required to radiate directed heat to the surroundings.

A voltage is applied to the resistive thick film either via conductive tracks or directly to the resistive thick film. This is a desirable element design, as it is low-profile and lightweight, provides rapid heat up and cool down times, provides very uniform heat, and delivers power at low temperatures resulting in safer operation of the heating element.

Metal substrates such as aluminum and aluminum alloys and austenitic grades of stainless steel, such as 300 series stainless (300SS), are desirable for this application because of their excellent thermal performance characteristics. Aluminum and aluminum alloys are particularly desirable for this application because they have a thermal transfer 10 to 20 times that of stainless steel making thick film heaters on these substrates thermally fast acting and have a low density making for a very light, efficient heating element.

Prior art shows an insulating layer (glass enamel) applied to the substrate to electrically insulate the resistive thick film from the substrate. Glass based products produced by companies such as DuPont, Ferro and (Electro-Science Laboratories, Inc. (ESL) use a combination of melt flowable glass binder and insulative filler components. Various combinations of metal oxides in the thick film glass frit lower the melting temperature of the glass so that it flows and produces a continuous glass matrix containing the filler material at suitable firing temperatures.

Typical thick film glass frits are designed to fire at temperatures in excess of 800° C. and are typically used on substrates made of ferritic stainless steels, such as 400 series stainless (400SS). However, it is difficult to produce viable electrically insulating layers on lower temperature metal substrates such as aluminum and aluminum alloys, which have a low melting temperature (less than 660° C.) or other substrates which have a relatively high coefficient of thermal expansion (22-26 ppm/K). Enamel-based insulating layers commonly used for ferritic stainless steel substrates cannot be used for aluminum or aluminum alloy substrates or austenitic stainless steels substrates, as mismatched thermal expansion coefficients result in cracking of the electrically insulating layer during initial processing or under thermal cycling of the heater. Furthermore, these enamel coatings need to be applied at temperatures typically greater than 600° C., which is too close to the melting temperature of the aluminum or aluminum alloy substrates to produce a stable electrically insulating layer.

Melting temperatures below 600° C. can be achieved but have several limitations. Many of these insulators have lead or Cd in the thick film frits. However, the thick film formulations used to produce this element must be lead free in order to comply with the RoHS Directive adopted by Europe in 2006. In addition, these insulators do not have the required dielectric strength to meet regulatory safety standards.

Low to no melt flow polymer formulations such as polyimide may be used to form an electrically insulating layer on low temperature substrate materials. However, these polymer formulations have either (1) a low temperature limitation, (2) are not able to transfer the wide range of power densities required for consumer and industrial heating element applications into heating the substrate, (3) do not provide the required electrical insulation performance, (4) cannot withstand the resistive thick film processing conditions, or (5) compromise the integrity of the deposited resistive thick film.

The above problems with traditional insulating materials necessitate a unique materials solution for substrates having a low melting point or high coefficient of thermal expansion (CTE).

SUMMARY OF THE INVENTION

It is the object of the present invention to provide an integrated thick film heating element on a substrate that may be processed below 600° C. so that it can be used with aluminum, aluminum alloys, low temperature and/or high CTE substrate materials, has suitable electrical insulation properties under temperature cycling of about 250° C. (or higher) and is capable of operating over a wide range of power densities for consumer and industrial heating element applications.

To that end high temperature melt-flowable thermoplastic polymers mixed with a particulate filler, along with an electrically resistive lead free thick film and an electrically conductive electrode track formulations are disclosed herein that may be deposited and fired to form an integrated thick film heating element which may be processed at temperatures below 600° C. This thick film heating element is capable of operating over a wide range of power densities for consumer and industrial heating element applications, with suitable electrical insulation properties under temperature cycling of about 250° C. thus making it very useful for integration into a wide range of commercially useful products.

Particularly, the present invention provides a thick film heating element comprising a substrate, an electrically insulated dielectric layer comprising a high temperature melt flowable thermoplastic polymer/filler material composite-, an electrically resistive lead free thick film that can be produced by composite sol gel technology, optionally a conductive thick film which is used to make electrical connection to the resistive element, and optionally a topcoat which is used to provide further electrical insulation and/or protection against moisture and oxidation. This heating element provides efficient and rapid heat up and cool down, can be designed to provide even temperature distribution, and delivers power at lower operating temperatures resulting in increased element safety.

The thick film heating element is cost effective and able to provide a competitive solution in a wide range of applications. These include but are not limited to space heaters, room heaters, device heaters, refrigerator defrosters, heated signage, food and beverage warmers and oil warmers to mention just a few.

In view of the fact that a great many commercial applications use aluminum or aluminum alloys, composite sol gel conductive and resistive formulations employed in certain embodiments of this invention have been selected so that they can be processed at temperatures below 600° C. on the substrates. In addition, these materials do not require the addition of lead or any other hazardous material to process the heating element, in keeping with the RoHS Directive adopted by Europe in 2006.

A dielectric coating comprising an electrically insulating high temperature thermoplastic polymer/filler material composite layer is deposited on the substrate and processed below 600° C. to form the dielectric layer coated substrate. The thermoplastic polymer powder is filled with a particulate lead-free material that does not exhibit significant melt flow up to the processing temperature of the polymer (which should not exceed about 600° C. when aluminum based substrates are used). The filler incorporated into the thermoplastic layer provides improved thermal expansion coefficient matching between the high temperature thermoplastic layer and the additionally deposited electrically resistive lead free thick film and the electrically conductive electrode track(s).

The filler material integrated into the thermoplastic layer increases the thermal conductivity of the resulting thermoplastic/filler composite layer to produce better heat transfer to the substrate and prevents generation of "hot spots", and provides a bonding layer so that the electrically resistive lead free thick film and the electrically conductive electrode track reliably and consistently do not sink into the insulating thermoplastic/filler composite layer when any of the additionally deposited resistive lead free thick films or electrically conductive electrode tracks are processed to a temperature near or above the melting temperature of the high temperature thermoplastic matrix, to avoid compromising the integrity of the electrical insulation.

A composite sol gel resistive thick film is then deposited on the coated substrate and processed to form a thick film heating element. The constituents of the sol gel are selected so that they can be processed below 600° C. in the case where the substrate is aluminum, aluminum alloys or the like. Voltage can be applied directly to this resistor or through a conductive track that connects to the resistive thick film and is also deposited onto the insulated dielectric layer coated substrate at a temperature below 600° C. If necessary, a topcoat layer may be deposited onto the electrically resistive heater layer to provide oxidation protection, moisture resistance and electrical insulation for the integrated heater element.

Thus, in one aspect of the invention there is provided a lead free thick film heating element on a substrate, comprising:

a dielectric coating located on said surface, said dielectric coating being made from an electrically insulating melt flowable high temperature thermoplastic polymer mixed with a pre-selected amount of a filler material; and an electrically resistive lead free thick film located on said dielectric coating having a resistance, such that when the voltage is applied to said electrically resistive lead free thick film it responsively heats.

The present invention provides a process for producing a sealed, electrically insulating thermoplastic based coating on a surface of a substrate comprising the steps of:

a) producing a dielectric coating on said surface of the substrate by
   i) mixing a melt flowable high temperature thermoplastic polymer powder and a pre-selected amount of powder filler material in a solution to form a uniform stable dispersion;
   ii) applying said uniform stable dispersion to a surface of the substrate so as to provide a coating thereon;
   iii) thermally processing said coated substrate at a temperature sufficient to remove any volatile and/or organic components from said uniform stable dispersion and melt flow the thermoplastic polymer powder and produce at least one electrically insulating coating containing the filler material on said substrate;

b) depositing an electrically resistive lead free thick film formulation onto a top surface of said at least one electrically insulating coating and thermally processing said electrically resistive lead free thick film formulation to produce an electrically resistive lead free thick film; and c) applying an electrical conductor in electrical contact with said electrically resistive lead free thick film for applying electrical power to said electrically resistive lead free thick film to heat it.

The present invention also provides an article having a heated metal component, comprising:

a) an article having a metal component configured to contact another article, the metal component having a surface;

b) a lead free thick film heating element formed on the surface of the metal component for heating said metal component, said lead free thick film heating element including
   i) a dielectric coating located on said surface, said dielectric coating being an electrically insulating melt flowable high temperature thermoplastic based thick film containing a pre-selected amount of a filler material;
   ii) an electrically resistive lead free thick film located on said dielectric coating,
   iii) an electrical conductor in electrical contact with said electrically resistive lead free thick film; and c) a battery connected to said electrical conductor and a switch for electrically connecting said battery to said electrical conductor such that when said switch is turned on a voltage is applied through said electrical conductor so that said electrically resistive lead free thick film is heated.

A further understanding of the functional and advantageous aspects of the invention can be realized by reference to the following detailed description and drawings.

BRIEF DESCRIPTION OF THE DRAWINGS

The invention will be more fully understood from the following detailed description thereof taken in connection with the accompanying drawings, which form a part of this application, and in which.

DETAILED DESCRIPTION OF THE INVENTION

Figure 1A:
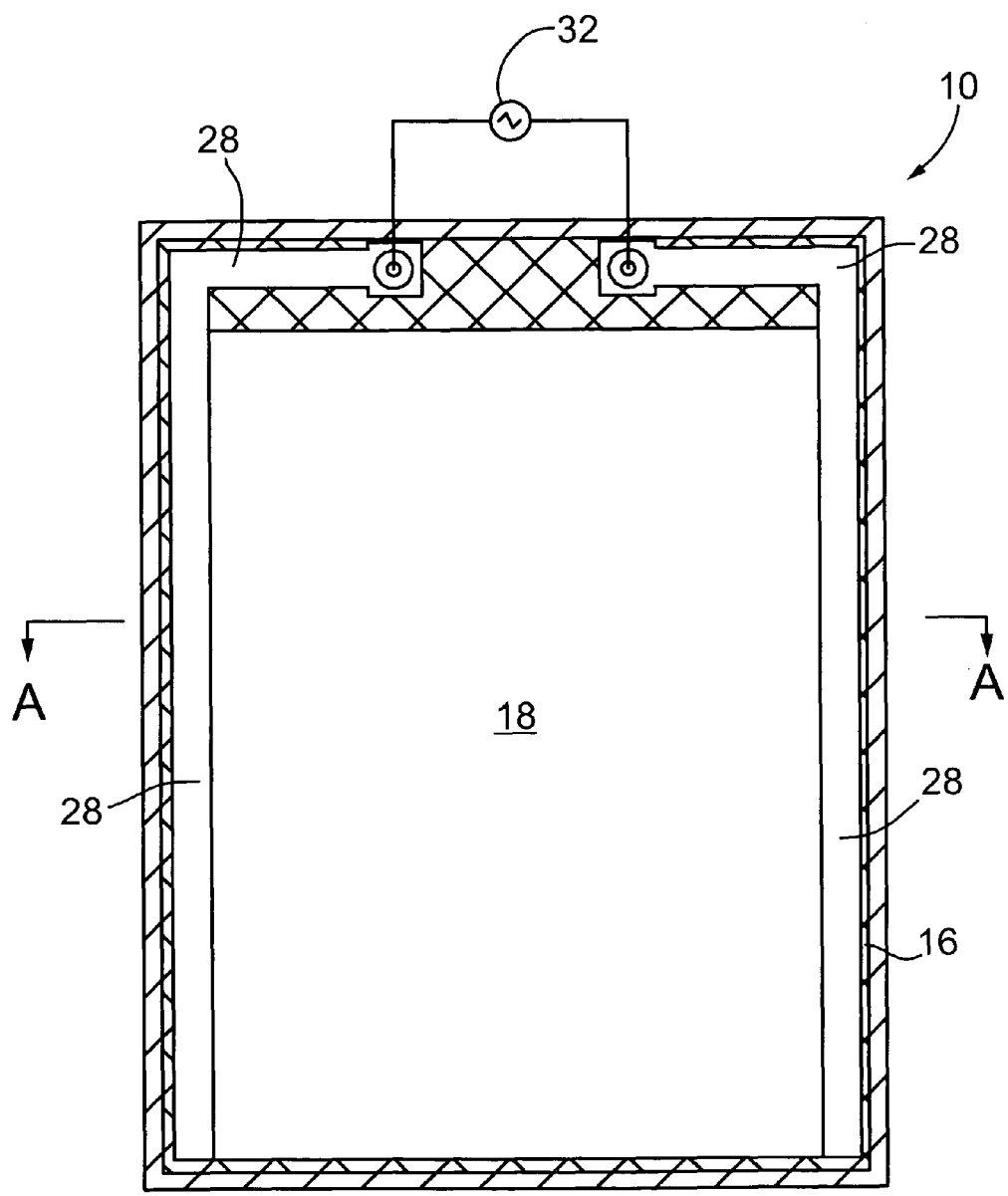
FIG. 1a is a top view of an embodiment of a thick film high temperature thermoplastic insulated heating element constructed in accordance with the present invention.

Generally speaking, the systems described herein are directed to a thick film high temperature thermoplastic insulated substrate-based heating element and a method for producing same using composite coating synthesis methods. As required, embodiments of the present invention are disclosed herein. However, the disclosed embodiments are merely exemplary, and it should be understood that the invention may be embodied in many various and alternative forms, including substitution of the metal substrate with another material such as glass or ceramic that may require further electrical insulation or leakage current reduction to satisfy operating requirements for the integrated thick film heating element.

Therefore, specific structural and functional details disclosed herein are not to be interpreted as limiting but merely as a basis for the claims and as a representative basis for teaching one skilled in the art to variously employ the present invention. The figures are not to scale. For purposes of teaching and not limitation, the illustrated embodiments are directed to a thick film high temperature thermoplastic insulated metal based heating element and a method for producing same using composite coating synthesis methods.

As used herein, the term "about", when used in conjunction with ranges of dimensions of particles or other physical properties or characteristics, is meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present invention.

As used herein, the phrase "electrically insulating melt flowable high temperature thermoplastic based thick film" means that a specified voltage may be applied across the thickness dimension of the thick film and electrical breakdown or unacceptable level of leakage current does not occur such that the film is termed electrically insulating, that the film structure includes a melt flowable thermoplastic matrix formed from melt flowable thermoplastic powders at a temperature typically above 250° C., and that the thick film structure withstands high temperatures, maintaining a solid structure at operating temperatures exceeding 180° C.

The term "thick film" as used herein is meant to refer to coatings that in general are >1 um in thickness. While the terms "thick films" and "thin films" are relative, in the coatings industry, "thin film" generally refers to technologies using nano or submicron thick coatings typically done for optical and electronic applications using techniques such as sputtering, PVD, MBE etc. which in some cases lay down atomic thick layers of the coating. On the other hand, "thick film" generally refers to technologies used for coatings that are >1 um and may be produced by deposition of several successive layers using techniques such as screen printing process. While "thick film" generally refers to films with a thickness in the range from about 1 to about 500 um which would cover the range for most commercial article heating applications, it will be appreciated that thicker films e.g about 1000 um or thicker are also covered by the term "thick film".

It will be understood that when referring to a dielectric coating located on the surface of a substrate which is made from an electrically insulating melt flowable high temperature thermoplastic polymer mixed with a pre-selected amount of a filler material, it will be understood that this "dielectric coating" may be a monolithic coating deposited in a single deposition process. Alternatively, it can also be understood to mean that the "dielectric coating" may comprise two or more coatings deposited and cured one on top of the other so that the "dielectric coating" is in fact two or more coatings used to build up the "dielectric coating". The amount of filler may be the same in each of the coatings or it may be varied for one or more of these multiple coatings.

When referring to processing temperatures for both the dielectric coating and the electrically resistive lead free thick film grown on top of the dielectric coating, it will be understood that the temperatures disclosed herein are exemplary only and not limited to those temperatures or temperature ranges. The temperatures that can be used will depend on the melt flowable high temperature thermoplastic polymer being used, the filler material being mixed with the thermoplastic polymer, the particular materials used to produce the electrically resistive lead free thick film, and the nature of the substrate. For example, when the substrates on which the heater elements are being formed are made from aluminum or aluminum alloys then an upper limit of around 600° C. since the melting point of these materials is around 600° C. Other the other hand, if stainless steels are the substrate material, processing temperatures higher than 600° C. could be used but in this case the processing temperatures would be dependent more so on the nature of the thermoplastic polymer being used, the filler material and the materials used to make the electrically resistive lead free thick film.

Figure 1B:
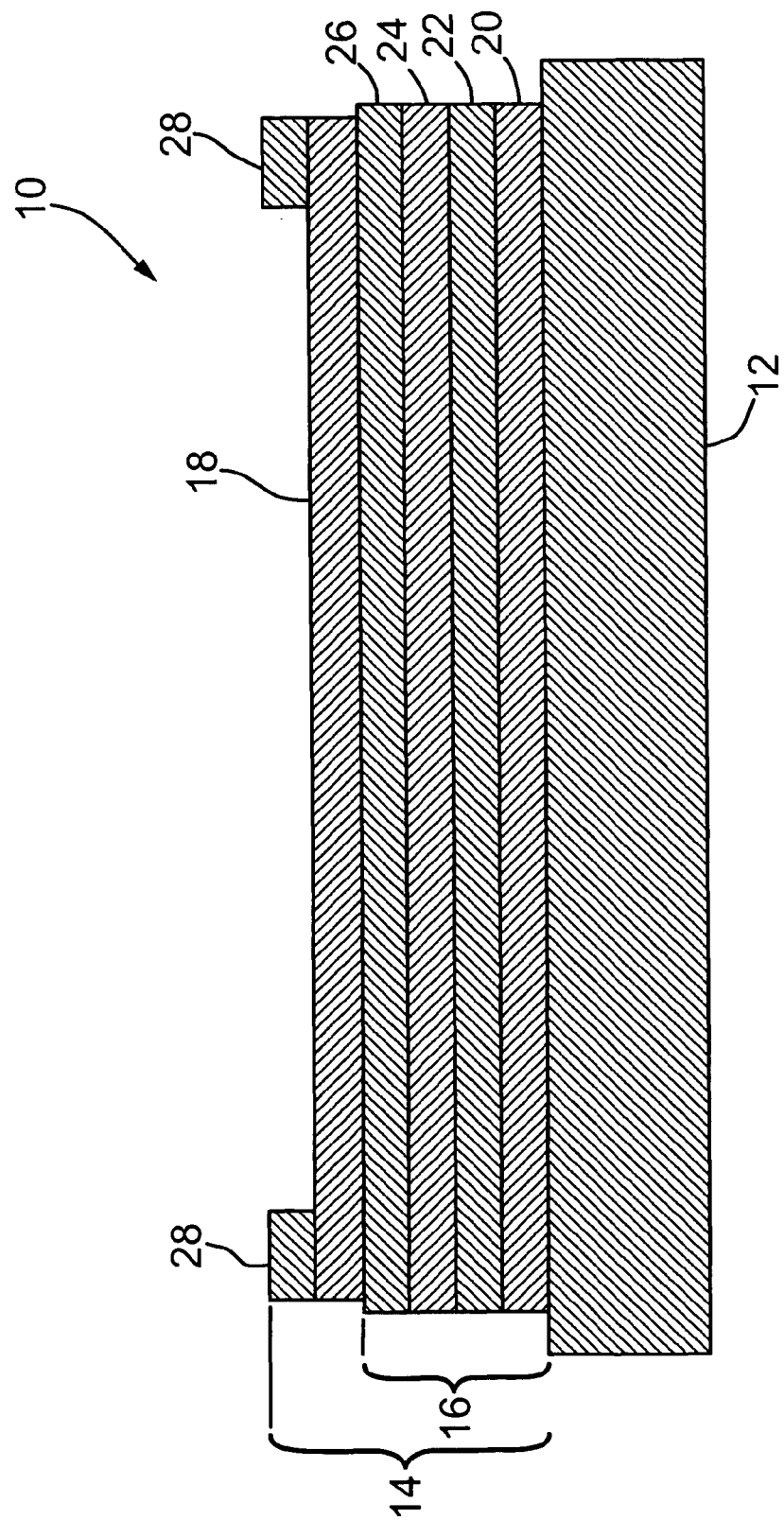
FIG. 1b is a cross sectional view of heating element of FIG. 1a taken along the line A-A.

FIGS. 1a and 1b illustrate an embodiment of the combined heater/substrate device shown generally at 10. More particularly, FIG. 1a shows a top view of the combined heater element 14/substrate 12 shown in FIG. 1b and FIG. 1b shows a cross section of the combination. The substrate 12, which is preferably metal such as used in many commercial products and may be made of aluminum, aluminum alloys, or stainless steels of any grade or quality. However, it will be appreciated that the substrate 12 may be of any material so long as it has a melting point above the maximum temperature that can be produced by the heater itself.

The heater element 14 is lead (and cadmium) free and may withstand temperatures of e.g. 500° C. The surface of substrate 12 may be treated to provide improved uniformity and adhesion of the coating layers from deposition to thermal processing to heating element operation. Examples of the surface treatment of the surface of the substrate include sanding, rubbing and sandblasting.

Heater component 14 as shown in FIG. 1b includes an insulating dielectric layer 16, and electrically resistive heater layer 18 on the dielectric layer 16, and two conductive strips/bus bars 28 located on the peripheral edge of resistive heater layer 18. A preferred embodiment of insulating dielectric layer 16 as shown in FIGS. 1b and 2b comprises four (4) separate insulating dielectric layers 20, 22, 24 and 26 with layer 20 located on the surface of substrate 12, layer 22 on layer 20, layer 24 on layer 22 and layer 26 on layer 24.

Dielectric layer 16 is an electrically insulating melt flowable high temperature thermoplastic based thick film. This electrically insulating dielectric layer 16 is made from a formulation containing a combination of high temperature melt flowable thermoplastic powders and filler materials in a suitable vehicle which includes various volatile and/or organic constituents, for deposition, which may be deposited and thermally processed to a temperature in the range of 300-450° C. to melt flow the thermoplastic powder and form a cohesive composite coating with the filler particles embedded in a bonded thermoplastic matrix that is adhered to the substrate (which in many commercial embodiments may be a metal substrate). In an embodiment of the device, dielectric layers 20, 22 and 24 may be identical and layer 26 may be of a different composition from the other three.

While there are four layers shown, there may be more or less layers and the present device is not restricted to four layers. Depositing the overall dielectric layer 16 in four layers is to minimize the effect of pinholes on the overall electrical insulation properties of the coating and to ensure that the various volatile organic constituents in the carrier are removed during baking. Each layer is deposited or coated by being printed (for example), then fired to form a rigid layer with all the volatile organic constituents removed except of course the melt flowable organic material itself, and then the next layer is deposited until all four layers are laid down. This process has been found to ensure good quality dielectric layers.

The four insulating dielectric layers 20, 22, 24 and 26 are produced from a melt flowable high temperature thermoplastic polymer which comprises at least one of polyphenylene sulfide (PPS), polyphthalamide (PPA), polyarylamide (PARA), liquid crystal polymer, polysulfone (PS), polyethersulfone (PES), polyphenylsulfone (PPSU, polyamide-imide (PAI), polyetheretherketone (PEEK), polyetherketone (PEK), polyetherketoneetherketone (PEKEK) or self reinforced polyphenylene (SRP), and any combination of these may be used.

Figure 2A:
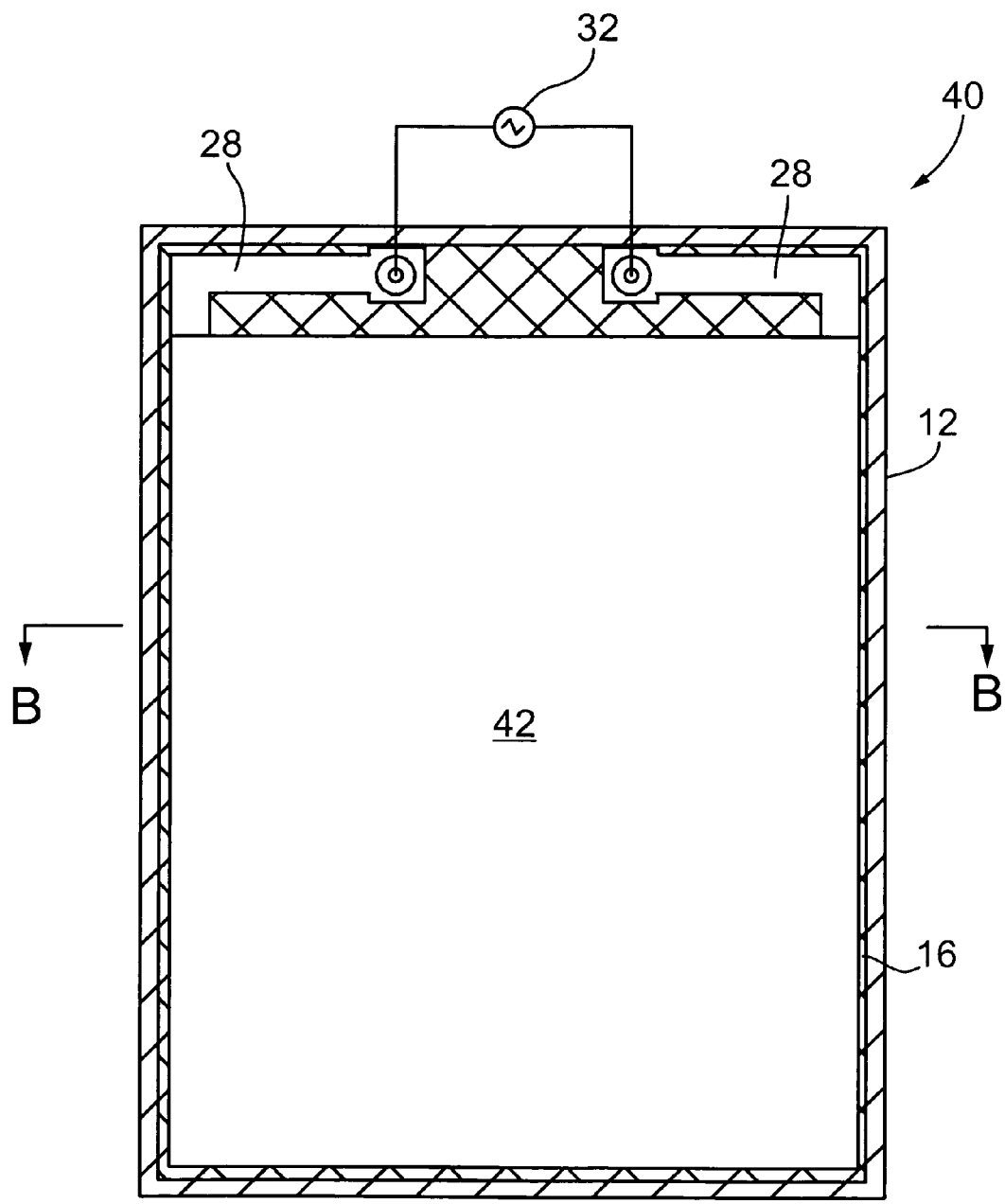
FIG. 2a is a top view of another embodiment of a thick film high temperature thermoplastic insulated heating element constructed in accordance with the present invention.
Figure 2B:
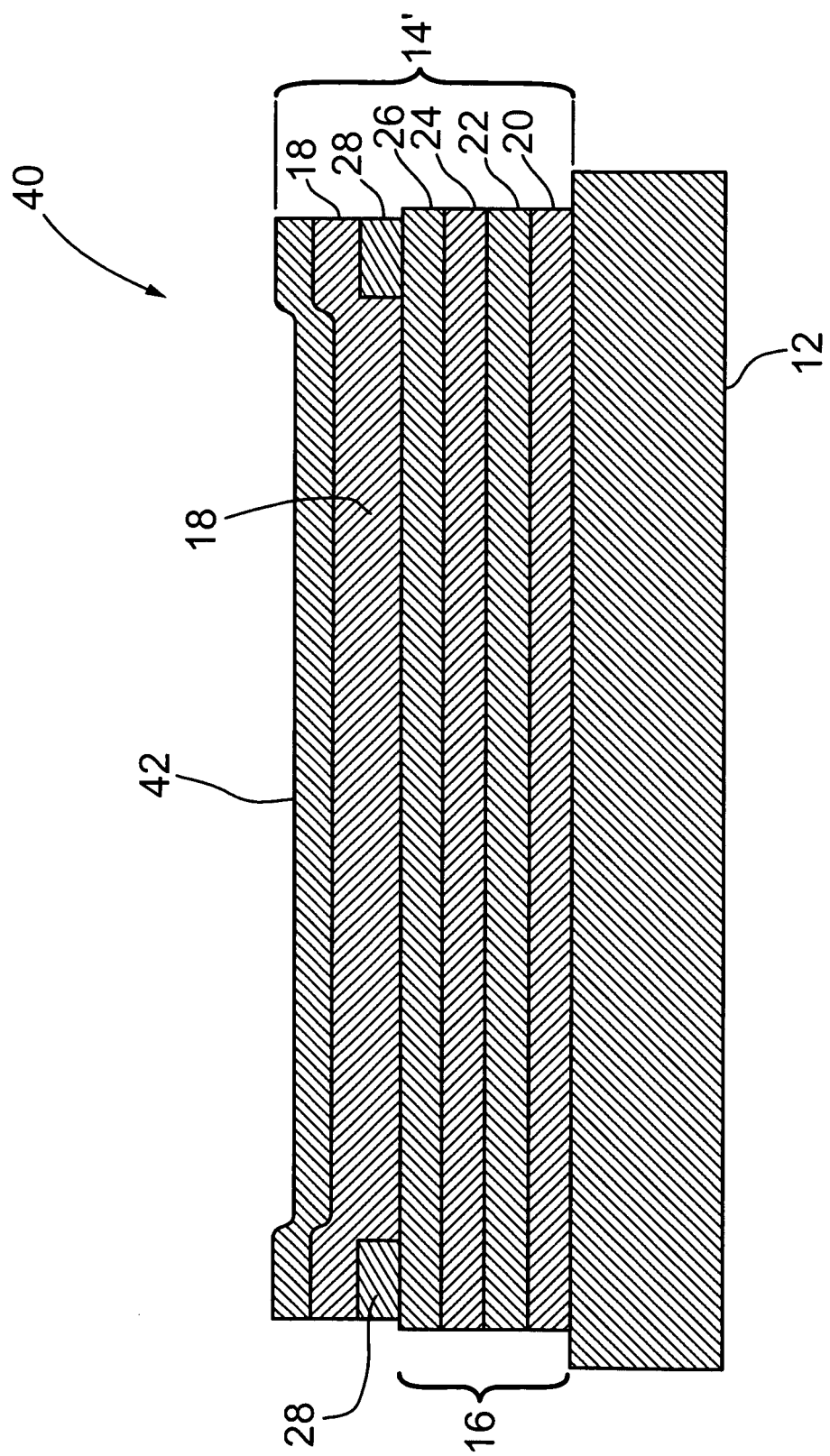
FIG. 2b is a cross sectional view of heating element of FIG. 2a taken along the line B-B.

FIGS. 2*a* and 2*b* show another embodiment of a heater element at 40 which is similar to element 10 of FIG. 1*a*, 1*b* with the exception that the heater element 14' now includes a top coat 42 located on top of the electrically resistive heater layer 18. In addition, the conductive strips/buss bars 28 are deposited directly onto the upper peripheral edge of dielectric layer 26 and the electrically resistive heater layer 18 is coated on top of layer 26/bus bars 28 as shown in FIG. 2*b*. A topcoat 42, which is electrically insulating and preferably contains ceramic, glass or low melt flow high temperature polymer filler particles (fluoropolymers, siloxanes, silicones, polyimides, etc.), may be optionally deposited onto the resistive and conductive thick films to provide oxidation protection and/or to ensure that the element is not affected by water.

In both embodiments of the heater illustrated in FIGS. 1*a* to 2*b*, the electrically resistive heater layer 18 is uniformly heated by application of a voltage to layer 18 through the conductive tracks 28 using a power source 32 in FIGS. 1*a* and 2*a*, which typically is a small battery which is usually flat or has a low profile so that it can be hidden on the commercial product.

The insulating dielectric layer 16 is important for the development of a functional heater for use on commercial products such as razor blades and hair irons. The primary requirement for the insulating dielectric layer 16 is high electrical insulation strength and high thermal conductivity, while at the same time the dielectric layer 16 must be deposited in such a way as to avoid pin holes. This is achieved by development of both appropriate formulations and proper processing parameters.

The melt flowable high temperature thermoplastic polymer layers are formulated using thermoplastic polymer powder particles which have a particle size in the range from about 1 to about 100 microns, and preferably has a particle size of from about 1 to about 20 microns. The powder size plays an important role in producing a uniform dispersion and even melt flow during processing. Combinations of melt flowable thermoplastic polymer powders were tested to improve dispersion and melt flow characteristics and wetting of filler, e.g., addition of PAI to PEEK was found to improve dielectric properties.

The filler material may include ceramics, glass or high temperature polymer particles. The filler material may have a particle size in the range from about 0.1 microns to about 100 microns, and preferably in a range from about 1 to about 20 microns. In each of the base dielectric layers 20, 22 and 24, the filler is present in the polymer in a range from about 5-80 weight percent and preferably in a range from about 20-60 weight percent, and most preferably it is present in an amount of about 35-45 weight percent.

The powder filler material is added to the melt flowable high temperature thermoplastic powder and has the following functions. First, it provides improved thermal expansion coefficient matching between the high temperature thermoplastic layer and the additionally deposited resistive and conductive thick films both during initial processing and during electrical cycling operation of the integrated heating element. Secondly, the filler increases the thermal conductivity of the insulating layer to produce better heat transfer to the metal substrate and prevent generation of "hot-spots" in the resistive layer during operation of the heater. Third, with the presence of the filler in the dielectric layer, additionally deposited resistive or conductive thick films on the top of layer 26 reliably and consistently do not sink into the insulating thermoplastic layer 16 when any of these additionally deposited resistive or conductive thick films are processed to a temperature near or above the melting temperature of the high temperature thermoplastic matrix, compromising the integrity of electrical insulation.

Thus the filler particles serve to reinforce the layer 16. Examples of suitable ceramic materials include alumina, zirconia, silica, (optionally ceria stabilized zirconia or yttria stabilized zirconia), titania, calcium zirconate, silicon carbide, titanium nitride, nickel zinc ferrite, calcium hydroxyapatite and any combinations thereof. Alumina has the highest thermal conductivity and dielectric strength.

It has been observed that layering of base dielectric layer 16 such as illustrated in FIGS. 1*b* and 2*b* is preferred to achieve a minimum thickness of 180 μm to obtain 3000V hi-pot strength at 250° C. as required by regulatory standards such as IEC 60335 (International Electrotechnical Commission). This can require up to 6 layers to achieve when spray or screen printing. Each layer is processed below 600° C., typically to 400-450° C. to cure the coating the coating.

Alternatively, a thick film of the required thickness, required composition and filler loading can be placed directly on the substrate prior to processing at temperatures in the range from about 400 to about 450° C. Thermal processing is performed in air using conventional furnace or IR heating may be used. An advantage of the present heater element over glass frit dielectric based heaters is that in the present device the processing parameters to get melt flow are not critical and the furnace profile is not critical, unlike the conditions required with glass frit dielectric based heaters.

Top dielectric layer 26 is added to the base dielectric layers 20, 22 and 24 to provide a bonding layer which adheres to the electrically resistive heater layer 18 and conductive strips 28. Upper most layer 26, while made of the same thermoplastic polymer as the based dielectric layers 20, 22 and 24, has a higher filler loading than these base dielectric layers, up to 95% by weight, and can be applied and processed in the same was as the base dielectric layers 20, 22 and 24.

In the top dielectric layer 26, the filler is present in the polymer in a range from about 5-95 weight percent and preferably in a range from about 40-80 weight percent, and most preferably it is present in an amount of about 60-70 weight percent. The top dielectric layer 26 is also useful in that it provides increased mechanical stability and improved coefficient of thermal expansion (CTE) which facilitates a much better thermal matching to the insulating dielectric layers 20, 22 and 24 and electrically resistive heater layer 18 both during processing and subsequent operation under applied electrical power at elevated temperatures.

A lead-free composite sol gel based electrically resistive heater layer 18 is deposited onto the thermoplastic composite coating and processed (fired) to a temperature below 600° C., typically in the range from about 400 to about 450° C. (but not limited thereto) to cure the coating. The temperature is selected to give a crack-free layer 18 free of volatile and/or organic constituents. The composite sol gel resistive thick layer 18 may be made according to the teachings of U.S. Pat. No. 6,736,997 issued on May 18, 2004 and U.S. Pat. No. 7,459,104 issued Dec. 2, 2008 both to Olding et al., (which are incorporated herein in their entirety by reference) and the resistive powder can be one or graphite, silver, nickel, doped tin oxide or any other suitable resistive material, as described in the Olding patent publication.

The sol gel formulation is a solution containing reactive metal organic or metal salt sol gel precursors that are thermally processed to form a ceramic material such as alumina, silica, zirconia, (optionally ceria stabilized zirconia or yttria stabilized zirconia), titania, calcium zirconate, silicon carbide, titanium nitride, nickel zinc ferrite, calcium hydroxyapatite and any combinations thereof. or combinations thereof. The sol gel process involves the preparation of a stable liquid solution or "sol" containing inorganic metal salts or metal organic compounds such as metal alkoxides. The sol is then deposited on a substrate material and undergoes a transition to form a solid gel phase. With further drying and firing at elevated temperatures, the "gel" is converted into a ceramic coating.

The sol gel formulation may be an organometallic solution or a salt solution. The sol gel formulation may be an aqueous solution, an organic solution or mixtures thereof.

A lead-free conductive thick film can be used to make the conductive strips/buss bars 28 for making an electrical connection to the resistive thick film element 18. This conductive strips 28 are deposited either before (see FIG. 2b) or after deposition of the resistive coating (see FIG. 1b). It can be processed using a separate processing step at a temperature of 450° C. or less or alternatively it can be co-fired with the resistive thick film 18. The lead-free conductive thick film can be made from a composite sol gel formulation that contains nickel, silver or any other suitable conductive powder or flake material. The sol gel formulation may be prepared from, but is not limited to, alumina, silica, zirconia, or titania metal organic precursors stabilized in solution.

Alternately, the conductive track 28 may be produced from any commercially available thick film product that is lead-free and can be thermally processed at a temperature of 450° C. or less. One suitable thick film product is Parmod VLT from Parelec, Inc. which contains a reactive silver metal organic, and silver flake or powder dispersed in a vehicle and can be fired at a temperature typically between 200-450° C. While Parmod VLT is a preferred commercially available conductive thick film product, it should be understood that other suitable conductive thick film products may be used, and that the present invention is not limited to these example products. Since the conductive film may not be exposed to the heating temperatures in the resistive thick film, some high temperature polyimide or polyamide-imide based silver thick film products may also be suitable for use in producing the conductive thick film track 28.

The present invention will now be illustrated with the following non-limiting examples. It will be appreciated that these examples and the processing conditions for making the heater elements are for purposes of illustration only and not meant to limit the scope of the present invention. For example, the substrates used, the constituents used to make each of the different layers will determine the processing temperatures but it will be appreciated that variations in substrate material, thermoplastic polymer, filler material, resistive heater layer composition may be accompanied by different processing temperatures and other conditions.

Example 1

A thick film thermoplastic insulated resistive heating element 40 as shown in FIG. 2b is fabricated on a 304 SS substrate material 12 by depositing and processing the three dielectric layers 20, 22 and 24 of base dielectric to 400° C., using a formulation comprising a ratio of 25 parts Victrex 704 PEEK powder, 4 parts Solvay Torlon AI-50 PAI powder, and 15 parts P662B alumina powder by weight in a uniform stable dispersion. While Victrex 704 PEEK and Torlon PAI are preferred powders, it should be understood that other suitable commercially available powders may be used, and that the present invention is not limited to these example products. A single layer top dielectric 26 is deposited and processed to 400° C., using a formulation comprising a ratio of 7 parts Vicote 704 PEEK powder to 13 parts of P662B alumina powder by weight in a uniform stable dispersion. A lead free conductive thick film track 28 is deposited and processed to 400° C. using Parmod VLT, a commercially available lead free thick film silver ink. A lead free resistive thick film 18 is deposited and processed to 400° C., using a formulation comprising graphite powder dispersed in an alumina-based sol-gel solution. The electrically resistive thick film 18 is deposited on the thermoplastic based dielectric insulated metal substrate 26/24/22/20 such that it makes contact with the conductive track 28 to form the thick film heating element 40.

A topcoat formulation containing 35 parts Vicote 704 PEEK powder, 2.2 parts Solvay Torlon AI-50 PAI powder, and 15 parts P662B alumina powder by weight in a uniform stable dispersion is deposited onto the heating element to provide top coat 42 to give both moisture protection and oxidation resistance. This topcoat 42 is processed to 400° C. Wire connectors are then attached to the thick film heating element 40 which are connected to a power source 32 as shown in FIG. 2a. When a voltage V is applied to the heating element 40, the element heats up according to input power $V^2/R$, where R is the resistance of the heating element. The heating element 40 passes a 3.5 kV AC room temperature hi-pot test for 60 seconds, and is capable of continuous operation at about 250° C.

Example 2

A thick film thermoplastic insulated resistive heating element is made according to Example 1, but the conductive track 28 is deposited and processed to 400° C. using a lead free silver thick film formulation comprising a silver flake dispersed in a silica-based sol gel solution.

Example 3

A thick film thermoplastic insulated resistive heating element is made according to Example 1, but the substrate material 12 is aluminum instead of 304SS.

Example 4

A thick film thermoplastic insulated resistive heating element is made according to Example 1, but the resistive thick film 18 is deposited before the conductive track 28 so that the track 28 is deposited on top of thick film 18 to give the structure of FIG. 1b.

Example 5

A thick film thermoplastic insulated resistive heating element is made according to Example 1, but both the conductive track 28 and resistive thick film 18 were deposited before processing to 400° C.

Example 6

A thick film thermoplastic insulated resistive heating element is made according to Example 1, but the conductive track 28 and resistive thick film 18 are processed to 450° C.

Example 7

A thick film thermoplastic insulated resistive heating element is made according to Example 1, except that a topcoat 42 is not included to give the structure 10 of FIG. 1*b* but with the conductive track 28 as shown in FIG. 2*b*.

Example 8

A thick film thermoplastic insulated resistive heating element is made according to Example 1, except that four layers of base dielectric having the same composition such as layers 24/22/20 are deposited and processed to 400° C. and a top dielectric layer such as layer 26 is not included. The top layer of base dielectric in this example does not contain PAI, as it can react with the silver film track causing an electrical failure in the track during heating element operation.

Example 9

A thick film thermoplastic insulated resistive heating element is made by depositing and processing the base 24/22/20 and top 26 dielectric layers as in Example 1. A resistive thick film track is then deposited and processed to 400° C. using a formulation comprising silver flake in an alumina sol-gel solution. The length and width of the silver track are set to give the required resistance. In this example, the resistive track of silver (or it may be graphite based, replaces both the electrically resistive layer 18 and conductive track 28 as it's dimensions and resistivity are selected such that it acts as both and it is laid in an elongate track pattern across the surface so as to be able to heat the surface up. Electrical contact is made to the two ends of this resistive track.

Example 10

A thick film thermoplastic insulated resistive heating element is made according to Example 8, except that the formulation for the four deposited base dielectric layers is comprising 40 parts Ryton™ PPS powder, 40 parts P662B alumina powder and 1 part fumed silica by weight in a uniform stable dispersion. (four dielectric layers of same composition as 24, 22, 20. The heating element passes a 3.5 kV AC room temperature hi-pot test for 60 seconds.

As used herein, the terms "comprises", "comprising", "including" and "includes" are to be construed as being inclusive and open ended, and not exclusive. Specifically, when used in this specification including claims, the terms "comprises" and "comprising" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A lead free thick film heating element, comprising:
   a substrate having a surface;
   a lead free dielectric coating located on, and adhered to, said surface, said lead free dielectric coating being made from an electrically insulating melt flowable high temperature thermoplastic polymer mixed with a pre-selected amount of a filler material; and
   an electrically resistive lead free thick film made from a sol-gel composite located on, and adhered to, said dielectric coating and having a resistance, such that when a voltage is applied to said electrically resistive lead free thick film it responsively heats.

2. The heating element according to claim 1 wherein said electrically insulating melt flowable high temperature thermoplastic polymer is selected from the group consisting of polyphenylene sulfide (PPS), polyphthalamide (PPA), polyarylamide (PARA), liquid crystal polymer, polysulfone (PS), polyethersulfone (PES), polyphenylsulfone (PPSU, polyamide-imide (PAI), polyetheretherketone (PEEK), polyetherketone (PEK), polyetherketoneetherketone (PEKEK), self reinforced polyphenylene (SRP), and any combination thereof.

3. The heating element according to claim 1 wherein said electrically insulating melt flowable high temperature thermoplastic polymer is made from a combination of polyetheretherketone (PEEK) and polyamide-imide (PAI).

4. The heating element according to claim 2 wherein said electrically resistive lead free thick film is an elongate track laid down in a pattern across said dielectric coating and has a length, width and resistivity selected to heat to a selected temperature when the voltage is applied across said elongate track.

5. The heating element according to claim 4 wherein said elongate track laid down in a pattern across said dielectric coating is an elongate resistive silver or resistive graphite track.

6. The heating element according to claim 2 including two electrical conductors in electrical contact with said electrically resistive lead free thick film, said electrical conductors having contacts for applying the voltage to said electrical conductors.

7. The heating element according to claim 6 wherein said two electrical conductors are two separate electrically conductive thick film tracks deposited on at least a portion of a top surface of the electrically resistive lead free thick film.

8. The heating element according to claim 7 wherein said electrically conductive thick film tracks extend substantially around a circumferential periphery of said electrically resistive lead free thick film.

9. The heating element according to claim 6 wherein said electrical conductor is two separate electrically conductive thick film tracks sandwiched between said dielectric coating and said electrically resistive lead free thick film and in contact with at least a portion of the electrically resistive lead free thick film.

10. The heating element according to claim 9 wherein said two separate electrically conductive thick film track extend substantially around a circumferential periphery of said electrically resistive dielectric coating and said electrically resistive lead free thick film.

11. The heating element according to claim 1 wherein said electrically insulating melt flowable high temperature thermoplastic polymer is made from a powder having a particle size in a range from about 1 to about 100 microns.

12. The heating element according to claim 11 wherein said melt flowable high temperature thermoplastic polymer is made from a powder having a particle size in a range from about 1 to about 20 microns.

13. The heating element according to claim 2 wherein said filler material is selected from the group consisting of ceramics, glass and high temperature polymers, and wherein the filler material is present in a range from about 5 to about 95% weight percent.

14. The heating element according to claim 2 wherein said filler material is made from particles having a particle size in a range from about 0.1 to about 100 microns.

15. The heating element according to claim 14 wherein said particles have a particle size in a range from about 1 to about 20 microns.

16. The heating element according to claim 2 wherein the dielectric coating includes two or more electrically insulating melt flowable high temperature thermoplastic based thick films, wherein a first electrically insulating melt flowable high temperature thermoplastic based thick film containing a first pre-selected amount of the filler material is deposited onto the surface of the substrate, and wherein a second or subsequent electrically insulating melt flowable high temperature thermoplastic based thick film(s) containing pre-selected amount(s) of a filler material are subsequently deposited onto said first electrically insulating melt flowable high temperature thermoplastic based thick film.

17. The heating element according to claim 16 wherein the first pre-selected amount of a filler material is present in a range from about 5 to about 80 weight percent.

18. The heating element according to claim 16 wherein the first pre-selected amount of a filler material is present in a range from about 20 to about 60 weight percent.

19. The heating element according to claim 16 wherein the first pre-selected amount of a filler material is present in a range from about 35 to about 45 weight percent.

20. The heating element according to claim 16 wherein a top-most electrically insulating melt flowable high temperature thermoplastic based thick film of said two or more electrically insulating melt flowable high temperature thermoplastic based thick films contains a pre-selected amount of the filler material higher than the pre-selected amount of the filler material in the films on which the top-most film is located and wherein the filler material in the top-most film is present in a range from greater than about 5 to about 95 weight percent.

21. The heating element according to claim 16 wherein the filler material in the top-most film is present in a range from about 40 to about 80 weight percent.

22. The heating element according to claim 16 wherein the filler material in the top-most film is present in a range from about 60 to about 70 weight percent.

23. The heating element according to claim 2 including a protective top layer deposited on top of the electrically resistive lead free thick film.

24. The heating element according to claim 2 wherein said substrate is selected from the group consisting of metals, metal alloys, plastics, glass, ceramics and semiconductors.

25. The heating element according to claim 2 wherein said electrically resistive lead free thick film is made from a lead free composite sol gel formulation which, when fired at elevated temperatures, is converted into a crack-free ceramic coating.

26. The heating element according to claim 25 wherein said sol gel formulation includes reactive metal organic or metal salt sol gel precursors selected such that the electrically resistive lead free thick film comprises a ceramic material selected from the group consisting of alumina, silica, zirconia (optionally ceria stabilized zirconia or yttria stabilized zirconia), titania, calcium zirconate, silicon carbide, titanium nitride, nickel zinc ferrite, calcium hydroxyapatite and any combinations thereof.

27. The heating element according to claim 25 wherein said sol gel formulation is an organometallic solution or a salt solution.

28. The heating element according to claim 25 wherein said sol gel formulation is an aqueous solution, an organic solution or mixtures thereof.

29. The heating element according to claim 26 wherein the ceramic material is selected from the group alumina, silica, zirconia and titania.

30. A process for producing a sealed, electrically insulating thermoplastic based coating on a surface of a substrate comprising the steps of:
   a) producing a lead free dielectric coating on said surface of the substrate by
      i) mixing a melt flowable high temperature thermoplastic polymer powder and a pre-selected amount of powder filler material in a solution to form a uniform stable dispersion;
      ii) applying said uniform stable dispersion to a surface of the substrate so as to provide a coating thereon;
      iii) thermally processing said coated substrate at a temperature sufficient to remove any volatile and/or organic components from said uniform stable dispersion and melt flow the thermoplastic polymer powder and produce at least one electrically insulating coating containing the filler material on said substrate;
   b) depositing an electrically resistive lead free thick film formulation onto a top surface of said at least one electrically insulating coating and thermally processing said electrically resistive lead free thick film formulation to produce an electrically resistive lead free thick film, said electrically resistive lead free thick film formulation being a lead free composite sol gel formulation; and
   c) applying an electrical conductor in electrical contact with said electrically resistive lead free thick film for applying electrical power to said electrically resistive lead free thick film to heat it.

31. The process according to claim 30 wherein said melt flowable high temperature thermoplastic polymer powder has a composition selected from the group consisting of polyphenylene sulfide (PPS), polyphthalamide (PPA), polyarylamide (PARA), liquid crystal polymer, polysulfone (PS), polyethersulfone (PES), polyphenylsulfone (PPSU, polyamide-imide (PAI), polyetheretherketone (PEEK), self reinforced polyphenylene (SRP), and any combination thereof.

32. The process according to claim 30 wherein said electrically insulating melt flowable high temperature thermoplastic polymer powder is made from a combination of polyetheretherketone (PEEK) and polyamide-imide (PAI).

33. The process according to claim 31 wherein steps a) i), ii) and iii) are repeated one or more times to produce two or more electrically insulating coatings stacked on top of each other, each coating containing the filler material.

34. The process according to claim 33 wherein a ratio of the melt flowable high temperature thermoplastic polymer powder and the powder filler material is adjusted in a top-most electrically insulating coating to provide an effective coefficient of thermal expansion between the electrically insulating coatings below said top-most electrically insulating coating and the electrically resistive lead free thick film.

35. The process according to claim 34 wherein the powder filler material in the uppermost electrically insulating coating is present in a range from about 40 to about 80 weight percent.

36. The process according to claim 31 wherein said melt flowable high temperature thermoplastic polymer powder has a particle size in the range from about 1 to about 100 microns.

37. The process according to claim 36 wherein said melt flowable high temperature thermoplastic powder has a particle size of from about 1 to about 20 microns.

38. The process according to claim 31 wherein said powder filler material has a particle size in the range from about 0.1 to about 100 microns and is selected from the group consisting of ceramics, glass or high temperature polymers.

39. The process according to claim 38 wherein said powder filler material has a particle size in the range from about 1 to about 20 microns.

40. The process according to claim 31 wherein the pre-selected amount of filler material is present in a range from about 5 to about 80 weight percent.

41. The process according to claim 40 wherein the pre-selected amount of filler material is present in a range from about 20 to about 60 weight percent.

42. The process according to claim 41 wherein the pre-selected amount of a filler material is present in a range from about 35 to about 45 weight percent.

43. The process according to claim 31 wherein said electrically resistive lead free thick film formulation is a lead free composite sol gel formulation containing reactive metal organic or metal salt sol gel precursors which is deposited on the at least one electrically insulating coating containing the filler material on said substrate whereupon the sol gel formulation is fired at elevated temperatures whereupon it is converted into a ceramic coating.

44. The process according to claim 43 wherein said reactive metal organic or metal salt sol gel precursors comprise constituents such that the ceramic coating comprises a ceramic material selected from the group consisting of alumina, silica, zirconia, titania, ceria and any combinations thereof.

45. The process according to claim 30 wherein step c) of said applying an electrical conductor includes depositing two separate electrically conductive thick film tracks on at least a portion of a top surface of the electrically resistive thick film after the electrically resistive thick film has been deposited.

46. The process according to claim 45 wherein said electrically conductive thick film tracks extend substantially around a circumferential periphery of said electrically resistive lead free thick film.

47. The process according to claim 31 wherein step c) of said applying an electrical conductor includes depositing two separate electrically conductive thick film tracks on at least a portion of a top surface of the dielectric coating prior to step b) of depositing the electrically resistive thick film formulation such that the electrically conductive thick film tracks are sandwiched between said dielectric coating and said electrically resistive lead free thick film and in contact with at least a portion of the electrically resistive lead free thick film.

48. The process according to claim 47 wherein said electrically conductive thick film tracks are deposited such that they extend substantially around a circumferential periphery of said electrically insulating dielectric coating and said electrically resistive lead free thick film.

49. The process according to claim 31 wherein said substrate is selected from the group consisting of metals, metal alloys, plastics, glass, ceramics and semiconductors.

50. The process according to claim 49 wherein said substrate is one of aluminum and aluminum alloys, and wherein said thermal processing in steps a) iii) and b) not exceeding about 600° C.

51. The process according to claim 31 including depositing a protective top layer deposited on top of the electrically resistive lead free thick film.

52. The process according to claim 51 wherein the sol gel formulation is fired at elevated temperatures suitable to give a crack-free ceramic coating.

53. An article having a heated metal component, comprising:
   a) an article having a metal component configured to contact another article, the metal component having a surface;
   b) a lead free thick film heating element formed on the surface of the metal component for heating said metal component, said lead free thick film heating element including
      i) a lead free dielectric coating located on, and adhered to, said surface, said lead free dielectric coating being an electrically insulating melt flowable high temperature thermoplastic based thick film containing a pre-selected amount of a filler material;
      ii) an electrically resistive lead free thick film made from a sol-gel composite located on, and adhered to, said dielectric coating,
      iii) an electrical conductor in electrical contact with said electrically resistive lead free thick film; and
   c) a battery connected to said electrical conductor and a switch for electrically connecting said battery to said electrical conductor such that when said switch is turned on a voltage is applied through said electrical conductor so that said electrically resistive lead free thick film is heated.

54. The article according to claim 53 wherein said electrically insulating melt flowable high temperature thermoplastic based thick film is made from a thermoplastic polymer selected from the group consisting of polyphenylene sulfide (PPS), polyphthalamide (PPA), polyarylamide (PARA), liquid crystal polymer, polysulfone (PS), polyethersulfone (PES), polyphenylsulfone (PPSU, polyamide-imide (PAI), polyetheretherketone (PEEK), polyetherketone (PEK), polyetherketoneetherketone (PEKEK), self reinforced polyphenylene (SRP), and any combination thereof.

55. The article according to claim 52 wherein said electrically insulating melt flowable high temperature thermoplastic based thick film is made from a combination of polyetheretherketone (PEEK) and polyamide-imide (PAI).

56. The article according to claim 53 wherein said electrically resistive lead free thick film is made from a lead free composite sol gel formulation which, when fired at elevated temperatures, is converted into a ceramic coating.

57. The article according to claim 56 wherein said sol gel formulation includes reactive metal organic or metal salt sol gel precursors selected such that the ceramic coating comprises a ceramic material selected from the group consisting of alumina, silica, zirconia, titania, ceria and any combination thereof.

58. The article according to claim 53 being any one of personal care products, heated signage, kettles, beverage heaters, hot plates, steam generators, in-line water heaters, dishwashers, washing machines, medical and semiconductor testing devices, and heaters for automotive applications.

59. The article according to claim 53 being mass produced.

* * * * *